(12) United States Patent
Haider et al.

(10) Patent No.: US 8,323,544 B2
(45) Date of Patent: Dec. 4, 2012

(54) METHOD AND APPARATUS FOR PRETREATMENT OF A SLIDER LAYER FOR EXTRUDED COMPOSITE HANDRAILS

(75) Inventors: Viqar Haider, Port Elgin (CA); Andrew Oliver Kenny, Toronto (CA)

(73) Assignee: EHC Canada, Inc., Oshawa (CA)

( * ) Notice: Subject to any disclaimer, the term of this patent is extended or adjusted under 35 U.S.C. 154(b) by 0 days.

(21) Appl. No.: 12/677,430

(22) PCT Filed: Sep. 10, 2008

(86) PCT No.: PCT/CA2008/001600
§ 371 (c)(1),
(2), (4) Date: Jun. 4, 2010

(87) PCT Pub. No.: WO2009/033273
PCT Pub. Date: Mar. 19, 2009

(65) Prior Publication Data
US 2010/0237535 A1    Sep. 23, 2010

Related U.S. Application Data

(60) Provisional application No. 60/971,156, filed on Sep. 10, 2007.

(51) Int. Cl.
B28B 3/20     (2006.01)
B29C 47/00    (2006.01)
B29C 63/00    (2006.01)
B32B 1/00     (2006.01)
B32B 37/00    (2006.01)
D01F 8/00     (2006.01)
B65G 15/00    (2006.01)
B65G 17/00    (2006.01)
B66B 23/22    (2006.01)
B66B 23/24    (2006.01)

(52) U.S. Cl. ........... 264/171.13; 264/171.1; 264/172.19; 264/176.1; 198/337

(58) Field of Classification Search .................. 264/345
See application file for complete search history.

(56) References Cited

U.S. PATENT DOCUMENTS
1,049,613 A    1/1913   Seeburger
(Continued)

FOREIGN PATENT DOCUMENTS
CA    898726    4/1972
(Continued)

OTHER PUBLICATIONS
Elevator World, Patents, Dec. 1990, p. 87.
(Continued)

Primary Examiner — Christina Johnson
Assistant Examiner — Benjamin Schiffman
(74) Attorney, Agent, or Firm — Bereskin & Parr LLP/S.E.N.C.R.L.,s.r.l.

(57) ABSTRACT

A method and apparatus for pretreatment of slider layer for extruded handrails has a slider layer source, a means of conveying the slider layer to a heating module which subjects the slider layer to an elevated temperature for a residence time, and a means of conveying the slider layer to an extrusion die head. One or more control feeders may be implemented for maintaining portions of the slider layer in a substantially tension-free loop as the slider layer is conveyed from the slider layer source to the extrusion die head. A cooling zone may be included to ensure adequate cooling between the heating module and the extrusion die head. Means for reducing heat transfer between the extrusion die head and the slider layer is also provided.

21 Claims, 5 Drawing Sheets

U.S. PATENT DOCUMENTS

| | | | |
|---|---|---|---|
| 1,101,209 A | 6/1914 | Pitt | |
| 1,186,550 A | 6/1916 | Cobb | |
| 2,373,764 A | 4/1945 | Lautrup et al. | |
| 2,669,339 A | 2/1954 | Hansen | |
| 2,721,158 A | 10/1955 | Mans | |
| 2,879,881 A | 3/1959 | Tilton | |
| 2,956,662 A | 10/1960 | Hansen | |
| 2,979,431 A | 4/1961 | Perrault | |
| 3,048,256 A | 8/1962 | Skinner | |
| 3,212,627 A | 10/1965 | Beebee | |
| 3,411,980 A | 11/1968 | Leshin | |
| 3,414,109 A | 12/1968 | Clark | |
| 3,463,290 A | 8/1969 | Tajima | |
| 3,481,807 A | 12/1969 | Kanamori | |
| 3,623,590 A | 11/1971 | Johnson | |
| 3,633,725 A | 1/1972 | Smith | |
| RE27,439 E | 7/1972 | Jackson | |
| 3,689,341 A | 9/1972 | Ninomiya | |
| 3,693,218 A | 9/1972 | Jaubert et al. | |
| 3,724,645 A | 4/1973 | Spaar | |
| 3,778,882 A | 12/1973 | Cameron et al. | |
| 3,783,063 A | 1/1974 | Olsson | |
| 3,783,704 A | 1/1974 | Lawson | |
| 3,865,225 A | 2/1975 | Phal | |
| 3,872,735 A | 3/1975 | Hnatek | |
| 3,874,968 A | 4/1975 | Robinson | |
| 3,885,071 A | 5/1975 | Blad et al. | |
| 3,909,176 A | 9/1975 | Madonini | |
| 3,949,858 A | 4/1976 | Ballocci et al. | |
| 3,956,056 A | 5/1976 | Boguslawski et al. | |
| 3,981,206 A | 9/1976 | Miranti, Jr. et al. | |
| 4,032,384 A | 6/1977 | Rauscher | |
| 4,034,617 A | 7/1977 | Guyer | |
| 4,050,322 A | 9/1977 | Moring | |
| 4,059,974 A * | 11/1977 | Fleissner | 68/15 |
| 4,087,223 A | 5/1978 | Angioletti et al. | |
| 4,161,769 A | 7/1979 | Elliott | |
| 4,169,393 A | 10/1979 | Wetzel et al. | |
| 4,274,821 A | 6/1981 | Kiemer | |
| 4,359,501 A | 11/1982 | DiTullio | |
| 4,381,273 A | 4/1983 | Azzola | |
| 4,427,107 A | 1/1984 | Roberts et al. | |
| 4,439,387 A | 3/1984 | Hawley | |
| 4,469,729 A | 9/1984 | Watanabe et al. | |
| 4,548,663 A | 10/1985 | Worcester | |
| 4,563,140 A | 1/1986 | Turecek | |
| 4,564,542 A | 1/1986 | Worcester | |
| 4,578,024 A | 3/1986 | Sicka et al. | |
| 4,581,807 A | 4/1986 | Adell | |
| 4,600,549 A | 7/1986 | Rajala et al. | |
| 4,618,387 A | 10/1986 | Fisher et al. | |
| 4,650,446 A | 3/1987 | Pinto et al. | |
| 4,681,646 A | 7/1987 | Pinto et al. | |
| 4,767,244 A | 8/1988 | Peterson | |
| 4,776,446 A | 10/1988 | Fisher et al. | |
| 4,839,220 A | 6/1989 | Stijntjes et al. | |
| 4,852,713 A | 8/1989 | Tatai et al. | |
| 4,891,040 A | 1/1990 | Nagai et al. | |
| 4,934,100 A | 6/1990 | Adell | |
| 4,946,020 A | 8/1990 | Rivera et al. | |
| 4,948,354 A | 8/1990 | Minaudo | |
| 4,957,199 A | 9/1990 | Wokke et al. | |
| 5,020,256 A | 6/1991 | French | |
| 5,083,985 A | 1/1992 | Alles | |
| 5,115,900 A | 5/1992 | Nurnberg et al. | |
| 5,160,009 A | 11/1992 | Iyoda et al. | |
| 5,162,151 A | 11/1992 | Smith et al. | |
| 5,165,643 A | 11/1992 | Shreiner | |
| 5,255,772 A | 10/1993 | Ball et al. | |
| 6,086,806 A | 7/2000 | Weatherall et al. | |
| 6,237,740 B1 | 5/2001 | Weatherall et al. | |
| 6,673,431 B1 | 1/2004 | Ledzinski | |
| 7,200,915 B2 | 4/2007 | Keun | |
| 7,404,477 B1 | 7/2008 | Toennisson et al. | |
| 2005/0173224 A1 | 8/2005 | Caunce | |
| 2009/0127067 A1* | 5/2009 | Guo et al. | 198/337 |
| 2009/0218192 A1* | 9/2009 | Holzner et al. | 198/337 |
| 2010/0117263 A1* | 5/2010 | Wesson et al. | 264/257 |

FOREIGN PATENT DOCUMENTS

| | | |
|---|---|---|
| CA | 936569 | 11/1973 |
| CA | 1048301 | 2/1979 |
| CA | 1261583 | 9/1989 |
| CA | 2333553 A1 | 1/2000 |
| CA | 2343037 A1 | 3/2000 |
| CA | 2482620 A1 | 3/2005 |
| DE | 839624 | 5/1952 |
| DE | 860477 | 12/1952 |
| DE | 907996 | 4/1954 |
| DE | 1027539 | 4/1958 |
| DE | 1127279 | 4/1962 |
| DE | 1019958 | 12/1964 |
| DE | 1936192 | 5/1970 |
| DE | 2000266 | 7/1971 |
| DE | 2142098 | 3/1973 |
| DE | 2911753 A1 | 10/1980 |
| DE | 2916253 | 10/1980 |
| DE | 3106253 A1 | 9/1982 |
| DE | 3113810 A1 | 10/1982 |
| DE | 3208916 A1 | 9/1983 |
| DE | 3433914 A1 | 3/1986 |
| DE | 3704524 A1 | 11/1989 |
| DE | 3921887 A1 | 1/1991 |
| DE | 3921888 A1 | 1/1991 |
| DE | 3930351 A1 | 3/1991 |
| DE | 4118946 A1 | 5/1992 |
| EP | 0134545 A1 | 3/1985 |
| EP | 0185006 A1 | 6/1986 |
| EP | 0273479 A1 | 6/1988 |
| FR | 2161856 | 7/1973 |
| FR | 2442935 | 6/1980 |
| GB | 1355039 | 5/1974 |
| GB | 2243163 | 10/1991 |
| JP | 52-16629 | 5/1977 |
| JP | 58-171594 | 10/1983 |
| JP | 58-222833 | 12/1983 |
| JP | 59-85728 | 5/1984 |
| JP | 62-189147 | 8/1987 |
| JP | 63-10266 Y2 | 3/1988 |
| JP | 2-277848 | 11/1990 |
| JP | 4-106092 | 4/1992 |
| JP | 4-185788 | 7/1992 |
| JP | 4-194011 | 7/1992 |
| JP | 7-206351 | 8/1995 |
| JP | 2007084979 | 4/2007 |
| JP | 2007246176 | 9/2007 |
| WO | 01/56914 A1 | 8/2001 |
| WO | 2007/075162 A1 | 7/2007 |
| WO | 2007/123534 A1 | 11/2007 |
| WO | 2009/033270 A1 | 3/2009 |
| WO | 2009/033272 A1 | 3/2009 |
| WO | 2009/033273 A1 | 3/2009 |

OTHER PUBLICATIONS

Eckstein et al., Thermoforming Thermoplastic Polyurethanes, Plastics Engineering, May 1995, p. 29.

International Search Report issued Dec. 23, 2008 in respect of corresponding International Application No. PCT/CA2008/001600.

* cited by examiner

METHOD AND APPARATUS FOR PRETREATMENT OF A SLIDER LAYER FOR EXTRUDED COMPOSITE HANDRAILS

FIELD

This specification relates generally to the field of composite extruded handrails including a slider layer.

BACKGROUND

U.S. Pat. No. 4,087,223 to Angioletti et al. discloses an extrusion device and the continuous manufacture of a handrail of elastomeric material, C-shaped in cross section. The extrusion device is provided with separate and distinct openings for the introduction of the various elements of the handrail, and with means which shape continuously said elements and arrange them continuously in mutual correct position into elastomeric material.

U.S. Pat. No. 6,237,740 to Weatherall et al. discloses a moving handrail construction, for escalators, moving walkways and other transportation apparatus having a generally C-shaped cross-section and defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer is formed from a harder thermoplastic than the second layer, and this has been found to give improved properties to the lip and improved drive characteristics on linear drives.

INTRODUCTION

In one aspect of this specification, a method for dry pretreatment of a slider layer for a handrail is provided. The method can comprise: conveying the slider layer through a heating module; maintaining the slider layer at an elevated temperature for a residence time within the heating module; and discharging the slider layer from the heating module.

The method can further comprise maintaining at least a portion of the slider layer in a substantially tension-free loop. The method can further comprise controllably conveying the slider layer from the heating module to an extrusion die head.

The method can further comprise providing a slider layer source, and using a first control feeder to convey at least a first portion of the slider layer from the slider layer source to the heating module while maintaining the first portion of the slider layer in a substantially tension-free loop. The method can further comprise using a second control feeder to convey a second portion of the slider layer from the heating module to the extrusion die head while maintaining the second portion of the slider layer in a substantially tension-free loop.

The method can further comprise locating the extrusion die head spaced apart from the heating module such that the slider layer is allowed to cool. The method can further comprise reducing heat transfer from the extrusion die head to the slider layer. Heat transfer from the extrusion die head to the slider layer can be reduced by providing a cooling insert at the portion of the extrusion die head that contacts the slider layer. The cooling insert can be water cooled.

The heating module can comprise a plurality of heating plates aligned in series. The slider layer can be formed of woven material. The woven material can be polyester fabric or cotton fabric.

The elevated temperature and the residence time can be sufficient to cause shrinkage of the slider layer. The elevated temperature can be 150 to 250° C.

In another aspect of this specification, an apparatus for pretreatment of a slider layer for handrails is provided. The apparatus can comprise: a slider layer source; a heating module for maintaining the slider layer at an elevated temperature; a device for conveying the slider layer from the slider layer source through the heating module and discharging the slider layer from the heating module; and at least one control feeder for maintaining at least a portion of the slider layer in a substantially tension-free loop.

The at least one control feeder can comprise a first control feeder located between the slider layer source and the heating module, the first control feeder for maintaining a first portion of the slider layer in a substantially tension-free loop as the slider layer is conveyed from the slider layer source to the heating module. The at least one control feeder can comprise a second control feeder located between the heating module and an extrusion die head, the second control feeder for maintaining a second portion of the slider layer in a substantially tension-free loop as the slider layer is conveyed from the heating module to the extrusion die head.

The apparatus can further comprise a cooling zone between the extrusion die head and the heating module. The extrusion die head can include a cooling insert for reducing the temperature of the slider layer. The cooling insert can be water cooled. The heating module can include a plurality of heating plates aligned in series.

In yet another aspect of this specification, an apparatus for controlling movement of a slider layer for extruded handrails during pretreatment of the slider layer is provided. The apparatus can comprise: a feed mechanism for controlling the movement of the slider layer; and at least one sensor for monitoring tension of the slider layer and for providing feedback to the feed mechanism to maintain a portion of the slider layer in a substantially tension-free loop.

The feed mechanism can comprise a motor and at least one pair of opposed rollers. The sensor can comprise an optical or laser sensor.

These and other features of the applicant's teachings are set forth herein.

DRAWINGS

A detailed description of one or more embodiments is provided herein below by way of example only and with reference to the following drawings, in which.

DESCRIPTION OF VARIOUS EMBODIMENTS

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. One or more inventions may reside in a combination or sub-combination of the apparatus elements or method steps described below or in other parts of this document. It is possible that an apparatus or method described below is not an embodiment of any claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Handrails are well known and a standard part of any escalator, moving ramp or other transportation apparatus. A typical configuration for such a handrail is a composite structure having a generally C-shaped cross section and defining an internal generally T-shaped slot, the handrail comprising (i) one or more layers of thermoplastic material extending around the T-shaped slot and defining the exterior profile of the handrail; (ii) a stretch inhibitor embedded within the first layer; and (iii) a slider layer lining the T-shaped slot and bonded to at least one of the one or more layers of thermoplastic material.

The slider layer is typically an elongate flexible web of sheet material having a generally constant width, and is usually formed of a fabric, either a natural material like cotton or a synthetic material such as polyester or nylon. The relatively low coefficient of friction of the slider layer enables the handrail to slide over guides. The width of the slider layer depends on the size of the handrail, and can be 125 to 60 mm wide, for example.

These composite handrails can have a generally uniform cross section enabling them to be implemented as an endless loop within the drive mechanism of an escalator or the like. Because of the uniform cross section, extrusion manufacturing is attractive in view of the alternative, namely, a batch-type process which tends to be labor intensive and has a rather limited production rate. An example of a method and apparatus for extrusion of thermoplastic handrail is disclosed in the Applicant's U.S. Provisional Application No. 60/971,152, filed on 10 Sep. 2007 and entitled "METHOD AND APPARATUS FOR EXTRUSION OF THERMOPLASTIC HANDRAIL", and the corresponding PCT Application filed on 10 Sep. 2008 and published as WO2009/033270, the entire contents of both are incorporated herein by reference.

However, some problems with the slider layer may arise during an extrusion manufacturing process. The importance of this should be appreciated considering that the inventors have discovered that the slider layer may be a major contributor to the overall bending modulus or stiffness of an extruded handrail, as described in the Applicant's U.S. Provisional Application No. 60/971,163, filed on 10 Sep. 2007 and entitled "MODIFIED HANDRAIL", and the corresponding PCT Application filed on 10 Sep. 2008 and published as WO2009/033272, the entire contents of both are incorporated herein by reference.

Handling of the slider layer and subjecting it to elevated temperatures may result in undesirable modification of the slider layer's physical properties. For example, pulling the slider layer through the extrusion die head under an uncontrolled tension coupled with the high temperature of the die may cause significant stretching of the slider, especially in the warp direction. For this reason, the inventors have discovered that it may be preferable that the slider layer undergo pretreatment prior to being extruded.

In an aspect of this specification, pretreatment of the slider layer includes the controlled dry heating of the slider layer at an elevated temperature for a particular residence time. The slider layer, which is typically either a natural or synthetic fabric, shrinks when heated due to stresses in the base fibers and weave that are remnants from the manufacturing processes. These stresses can be resolved by pretreatment with "heat setting" or "preshrinking" step, either in a separate batch-type process, or preferably inline prior to extrusion. Pretreating the slider layer can be accomplished by passing the layer at a predetermined rate between heated plates prior to entering the extrusion die head, for example. Other suitable means of heating the slider layer would be readily appreciated by a person of skill in the art.

It should be understood that a slider layer that has not been pretreated in this manner may exhibit a somewhat limited performance in tension, especially where the composite extruded handrail is to be bent backwards in a reverse drive mechanism or the like. A slider layer that has undergone a pretreatment allows for greater stretching of the layer in tension. Further, it has been found that pretreatment in this manner promotes greater adhesion and bonding between the slider layer and the one or more thermoplastic material layers that comprise the handrail.

However, the inventors have determined that even with a pretreatment step significant stretching may still occur, stemming from high temperatures and pressures in the extrusion die head, and/or tension of the slider layer during handling in the pretreatment process and when being conveyed to the extrusion die head. To address this, another aspect of this specification provides a means of eliminating or reducing tension in the slider layer feed. A further aspect of this specification provides a cooling zone between the pretreatment and the extrusion die head. A yet further aspect of this specification provides for the reduction of heat transfer between the extrusion die head and the slider layer. Each of these aspects is discussed more fully below.

Figure 1:
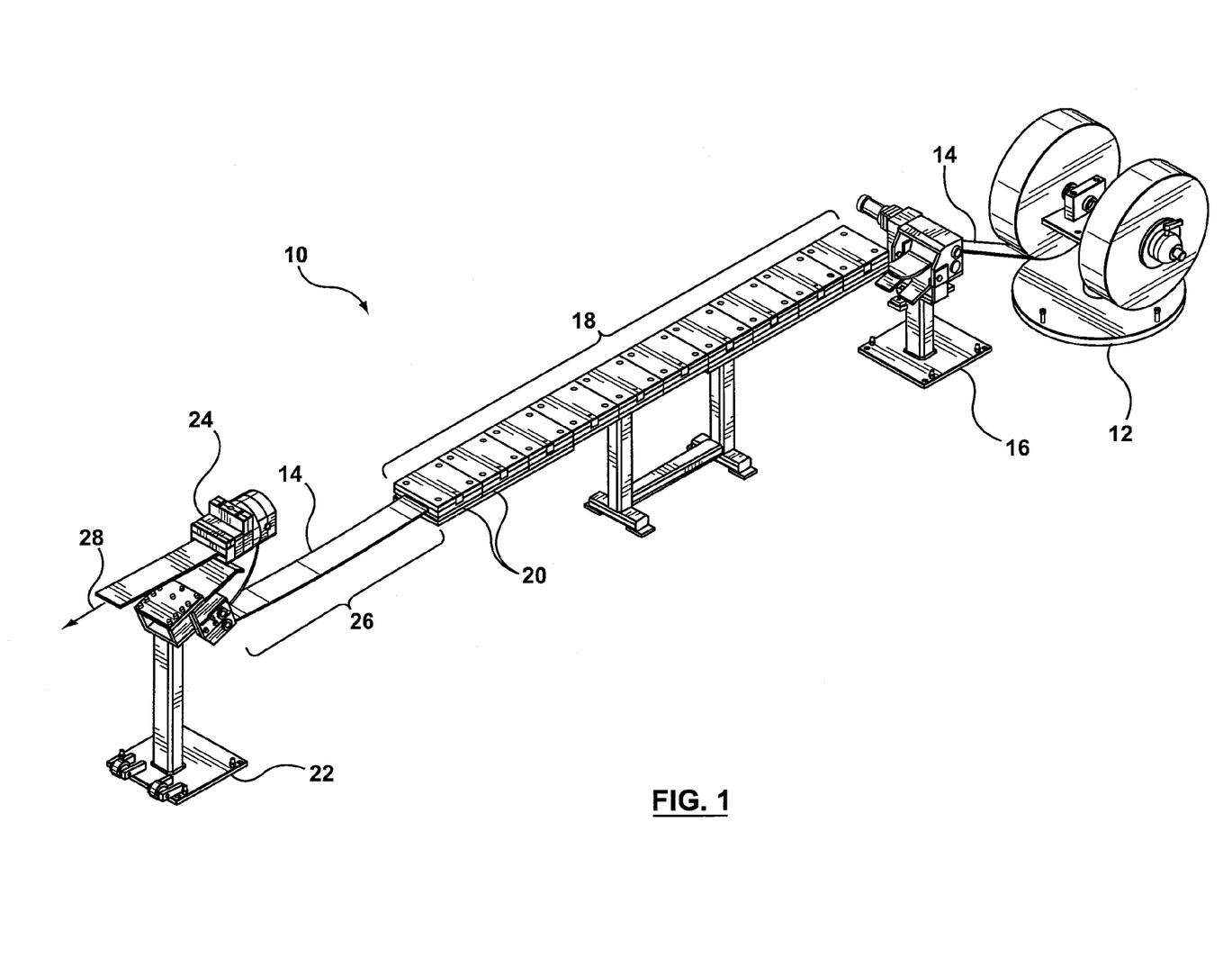
FIG. 1 is a perspective view pretreatment apparatus.

With reference to FIG. 1, an example of a pretreatment apparatus 10 is provided. A slider layer source 12 is located at an end of the apparatus 10 to provide a feed of the slider layer 14.

As illustrated, a first control feeder 16 can be located between the slider layer source 12 and the heating module 18. The first control feeder 16 serves to convey the slider layer 14 to the heating module 18 with very little or no tension, ensuring maximum possible shrinkage.

The heating module 18 can consist of a plurality of heating plates 20 arranged in series. The plates 20 can be, for example, Aluminum plates carrying 600 W cartridge heaters on the top and on the bottom, with each plate 10"×10"×0.75". Ten sets of the plates 20 can be arranged 0.25" apart. Each heating plate 20 is operable to maintain a predetermined elevated temperature, and can be subdivided into separate zones for maintaining separate temperatures. This increases the heat control and the process precision and may reduce they chance of error due to heater failure.

A second control feeder 22 can be located between the heating module 18 and the extrusion die head 24. It should be noted that heating module 18 is spaced apart from the extrusion die head 24 a distance 26, which is a cooling zone, allowing the slider layer time to cool at room temperature before entering the extrusion die head 24. The second control feeder serves to convey the slider layer 14 to the extrusion die head 24 with very little or no tension, preventing any undesirable stretching. The slider layer 14 and other handrail components (not shown) combine in the extrusion die head, emerging as extrudate 28.

Figure 2:
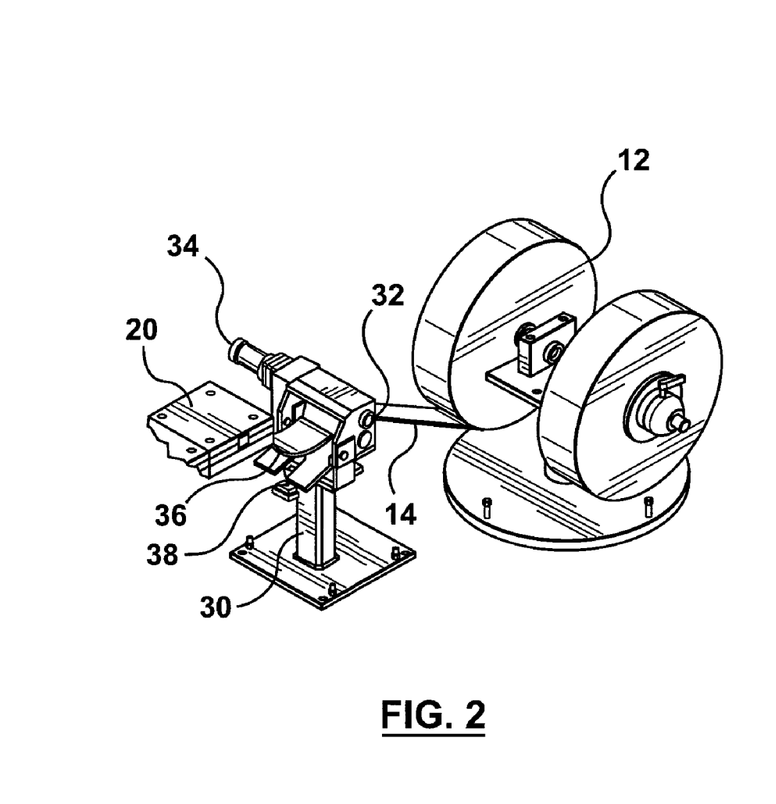
FIG. 2 is a perspective view of a slider layer source and a first control feeder.
Figure 3:
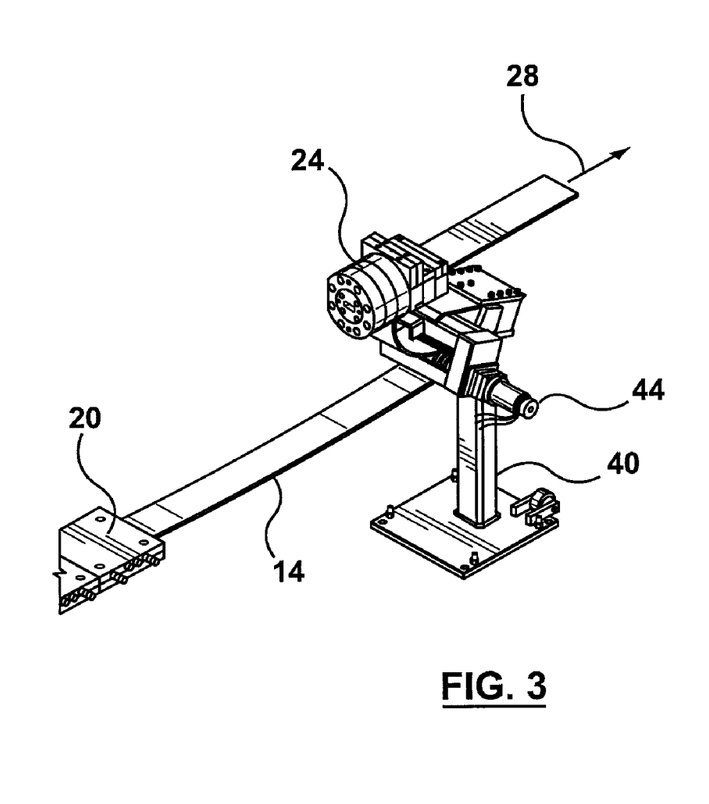
FIG. 3 is a perspective view of a second control feeder.
Figure 4:
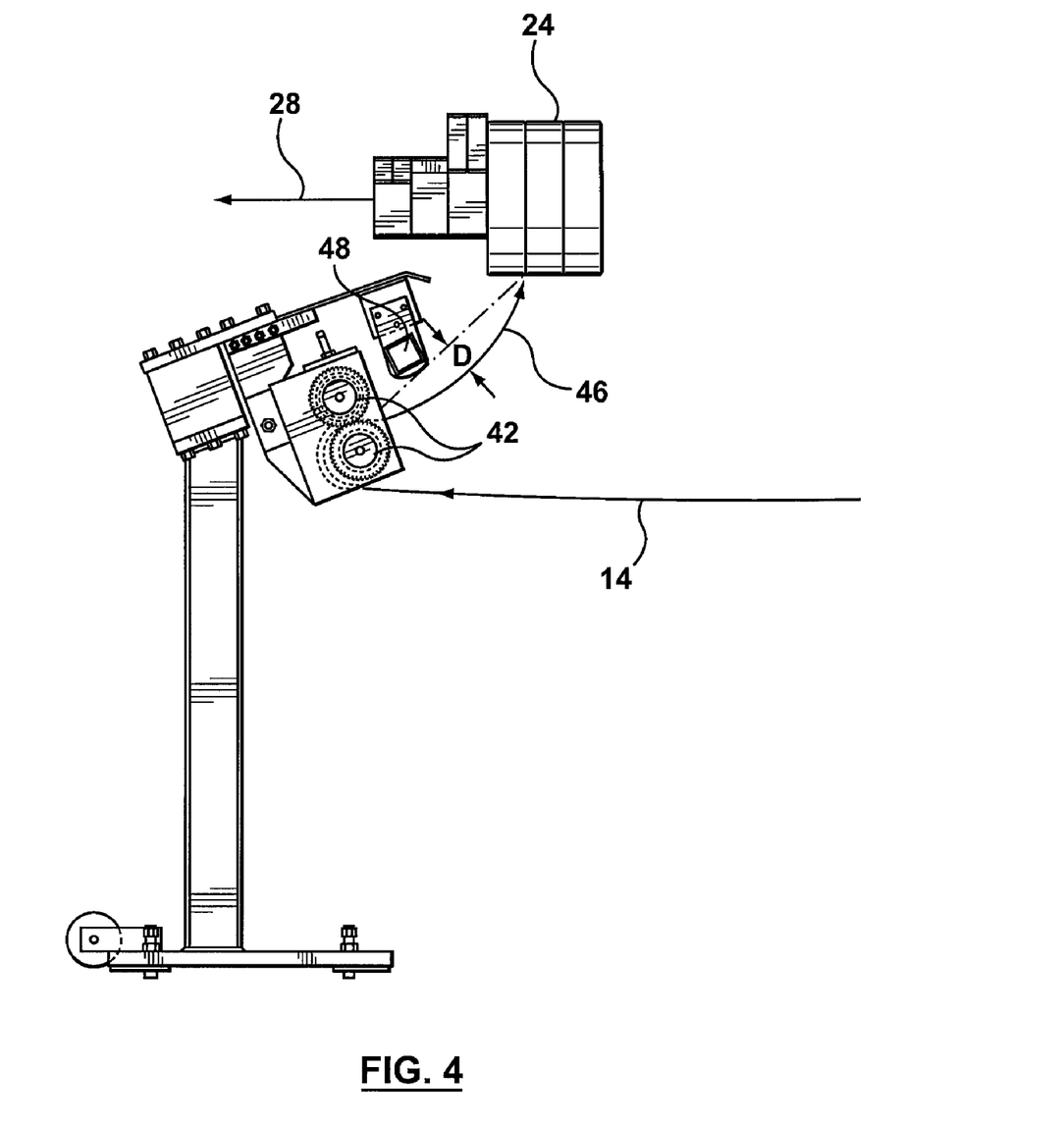
FIG. 4 is a side view of the second control feeder.

With reference to FIG. 2, the first control feeder 14 comprises a stand 30, opposed rollers 32, motor 34, controlled loop 36, and sensor 38. Similarly, as shown in FIG. 3, the second control feeder 22 comprises a stand 40, opposed rollers 42, motor 44, controlled loop 46 and sensor 48.

The control feeders 16, 22 serve to substantially reduce or eliminate tension on the slider layer 14 during pretreatment prior to the extrusion process. The slider layer 14 forms non-contact slider loops 36, 46, which are maintained by sensors 38, 48 that provide feedback to the motors 34, 44 based on line speed and demand for the slider layer 14. This setup ensures that there is a substantially tension-free loop before the heating module 18 and/or extrusion die head 24 entrances. The control feeders 16, 22 act to minimize or eliminate any tension or stress in the slider layer 14, which is important because any minor tension or stress while it is traveling through hot die parts can cause it to stretch, resulting in an undesirably stiff or rigid handrail.

The control feeders 16, 22 operate on a distance-based loop. The motors 34, 44, which can be DC variable speed motors, for example, can be computer-controlled (not shown) to feed the slider layer 14 forward based on demand from the extrusion line. The sensors 38, 48 are programmed by PLC and can be optical or laser sensors, for example. The sensors 38, 48 recognize the slider layer 14 and each maintains a distance D by providing feedback to the motors 34, 44. This in turn maintains a loop instead of a straight line (as shown), meaning that the slider layer 14 at the heating module 18 and/or extrusion die head 24 entrances is substantially tension-free.

The inventors recognized that a substantial portion of the stretching that happened to the slider layer 14 stemmed from the high temperature of the extrusion die head 24. With a view to reduce the change or stretch of the slider layer 14, thereby keeping modulus of elasticity unchanged, especially in the warp direction, it can be desirable to provide means for reducing heat transfer between the extrusion die head 24 and the slider layer 14. This can be achieved in at least two ways: (i) by eliminating heaters from bottom portions of the extrusion die head 24 where the slider layer 14 comes into contact; and (ii) by introducing a water cooled insert in the bottom portions of the extrusion die head 24 that come directly in contact with the slider layer 14.

Figure 5:
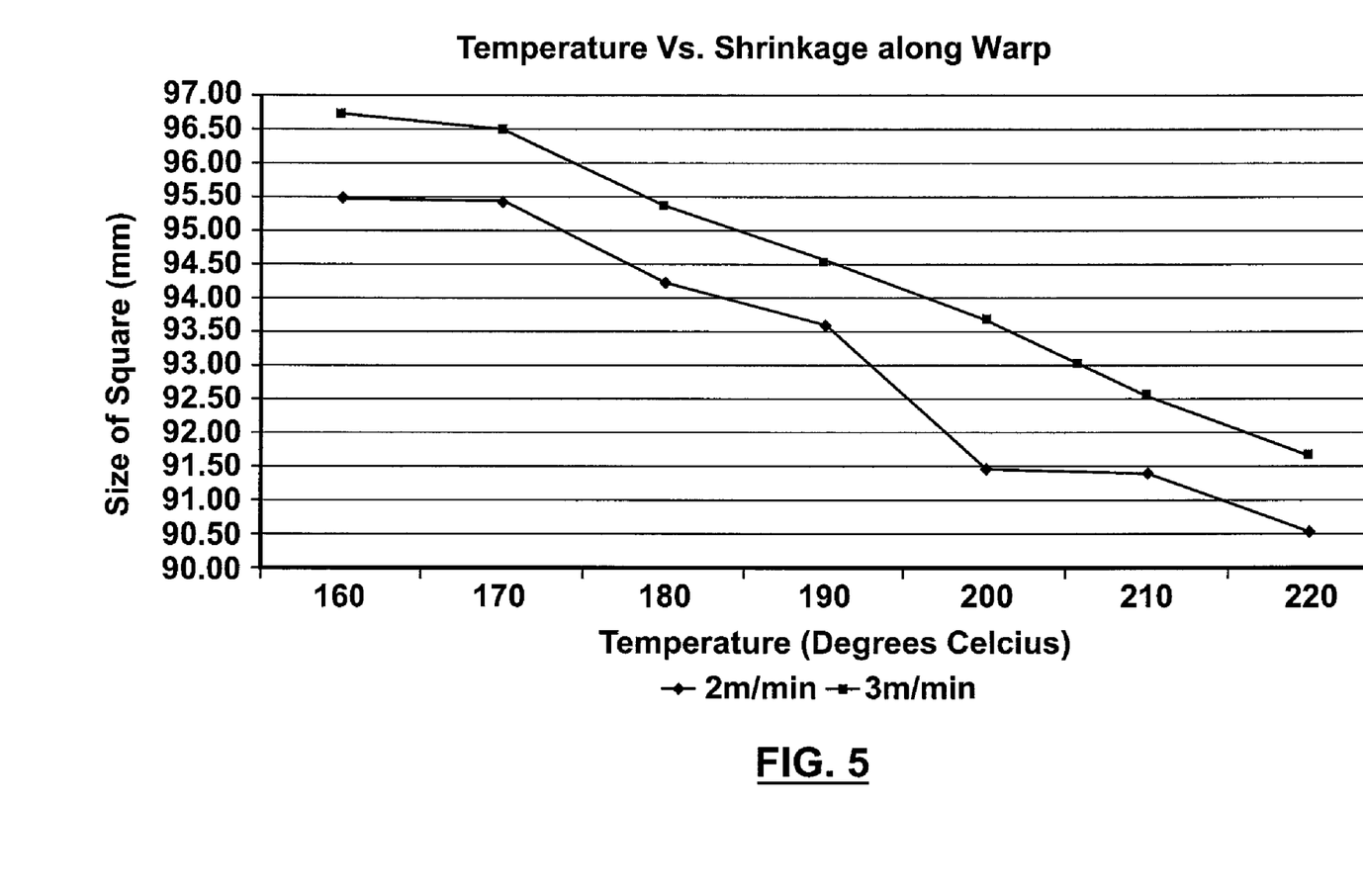
FIG. 5 is a graph illustrating shrinkage of the slider layer over time.

Testing was conducted to investigate the effect of different pretreatment conditions on a slider layer. The slider layer in this case was a spun polyester fabric having a Venetian weave with a width of 140 mm, a thickness of 0.80 to 0.90 mm and a fabric weight of 508+/−28 g/m2. Similar slider samples were marked with a 50×50 mm square and passed through a heating module (at 160 to 180° C. and 1.8 m in length) at different conditions. Afterwards, each square was measured in both warp and weft directions, and these values were summed. The results are summarized in FIG. 5. This experiment confirmed that higher residence time and higher temperature increased shrinkage of the slider layer. The lower line shows results from a fabric speed of 2 m/min, and the top line shows results with a fabric speed of 3 m/min, i.e. giving a one third reduction in the residence time.

Figure 6:
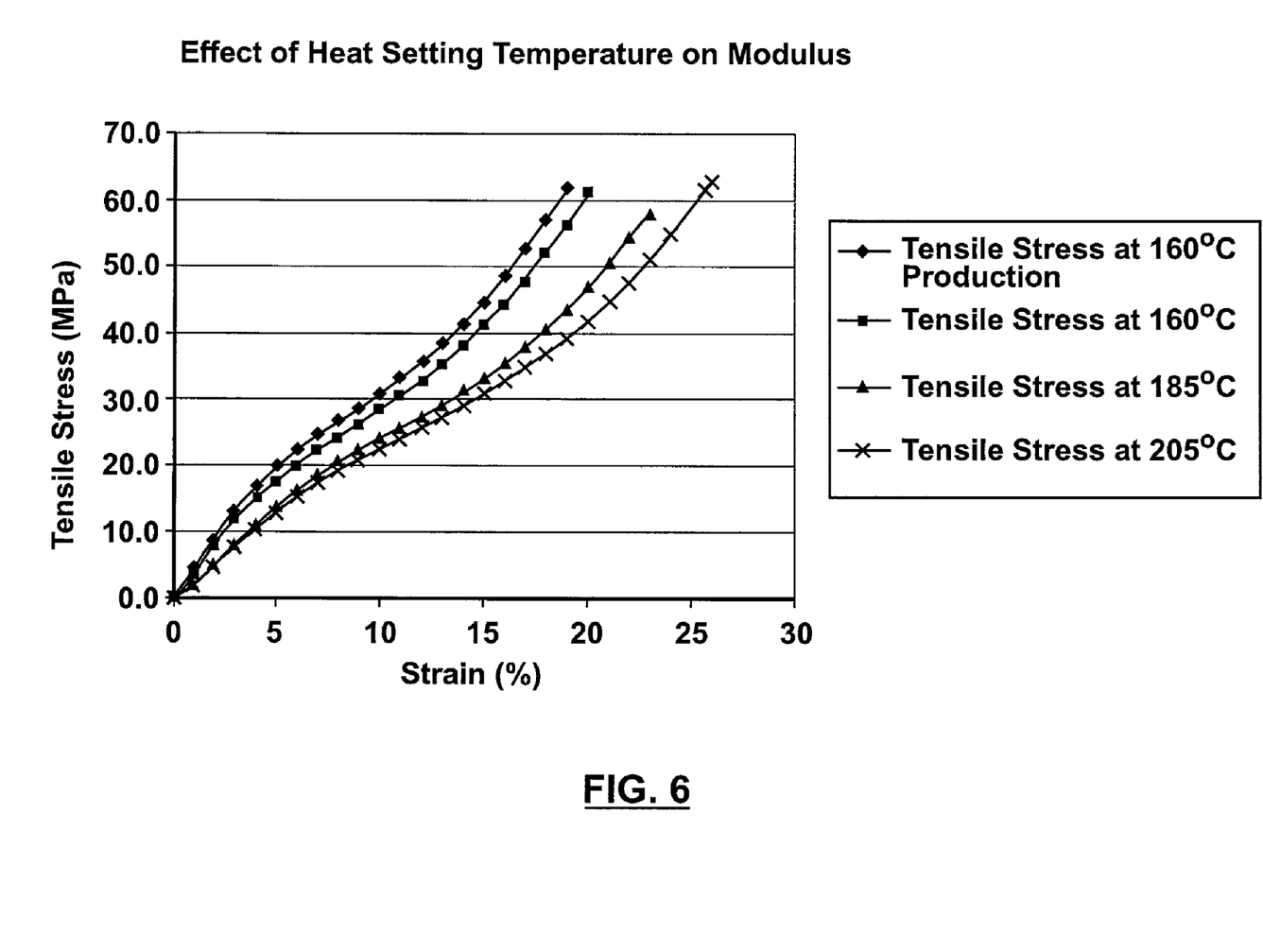
FIG. 6 is a graph illustrating effect of temperature on tensile stress of the slider layer.

Testing was also carried out with handrails extruded with slider layers having three pretreatment temperatures of 160, 185 and 205° C. with the pretreatment including the control feeders, and a slider layer having a pretreatment temperature of 160° C. without the use of control feeders. (The heating module was 1.8 m in length.) Slider layer modulus was determined using ASTM D-412 at 50.00 mm/min. The results are shown in FIG. 6. As shown therein, a higher pretreatment temperature leads to handrails having reduced tensile stress values. The effectiveness of the control feeders is also shown. The results of these tests suggested that the temperature and the length of heating module be increased (bearing in mind that the slider layer may become fragile if the temperature is too high).

Further tests were conducted to examine the variables affecting the slider layer pretreatment. The results are summarized in Table 1 below. "A" represents samples pretreated using a shorter heating module with a limited cooling zone, with the pretreatment exit and the extrusion die 200 mm apart. "B" represents sample pretreated with a longer heating module and with 1.25 m provided between the pretreatment exit and the extrusion die entrance, resulting in a residence time of approximately 50 seconds in room temperature to ensure the slider cools down to approximately 40° C. The "B" samples were observed to exhibit shrinkage of approximately 2 to 4%, versus 6 to 8% stretch observed for the "A" samples. Overall, the "B" conditions were considered well-suited for the particular slider layer (spun polyester fabric).

TABLE 1

|  | A | B |
|---|---|---|
| Pretreatment length (m) | 1.8 | 2.57 |
| Extrusion speed (m/min) | 2 | 2 |
| Pretreatment temperature (° C.) | 160-180 | 200 |
| Residence time in pretreatment (s) | 54 | 77 |
| Slider layer temperature at pretreatment exit (° C.) | 160 | 190 |
| Slider layer temperature at extrusion die entrance (° C.) | 140-160 | 30-40 |
| Extrusion die head temperature (° C.) | 200-210 | 200-210 |
| Residence time in extrusion die head (s) | 8 | 8 |
| Temperature of slider layer at extrusion die head (° C.) | 180-190 | 110 |

It should be understood that the pretreatment parameters discussed in the foregoing are provided by way of example only and in context to the particular slider material chosen, the particular extrusion process, and the particular configuration of the extruded composite handrail product. Different pretreatment parameters will be appropriate for different materials, extrusion processes and handrail configurations, all of which would be readily appreciated by a person of skill in the art.

It will be appreciated by those skilled in the art that other variations of the one or more embodiments described herein are possible and may be practised without departing from the scope of the present invention as claimed herein.

We claim:

1. A method for dry pretreatment of a slider layer for a handrail, the method comprising:
   conveying the slider layer through a heating module;
   maintaining the slider layer at an elevated temperature for a residence time within the heating module;
   discharging the slider layer from the heating module; and
   controllably conveying the slider layer from the heating module to an extrusion die head, for extrusion of a handrail.

2. The method of claim 1 further comprising maintaining at least a portion of the slider layer in a substantially tension-free loop.

3. The method of claim 1 further comprising providing a slider layer source, and using a first control feeder to convey at least a first portion of the slider layer from the slider layer source to the heating module while maintaining the first portion of the slider layer in a substantially tension-free loop.

4. The method of claim 1, further comprising using a second control feeder to convey a second portion of the slider layer from the heating module to the extrusion die head while maintaining the second portion of the slider layer in a substantially tension-free loop.

5. The method of claim 4, further comprising locating the extrusion die head spaced apart from the heating module such that the slider layer is allowed to cool.

6. The method of claim 5, further comprising reducing heat transfer from the extrusion die head to the slider layer.

7. The method of claim 6 wherein heat transfer from the extrusion die head to the slider layer is reduced by providing a cooling insert at the portion of the extrusion die head that contacts the slider layer.

8. The method of claim 7 wherein the cooling insert is water cooled.

9. The method of claim 1, wherein the heating module comprises a plurality of heating plates aligned in series.

10. The method is claimed in claim 9, wherein the heating module comprises a plurality of heating plates spaced apart and facing one another.

11. The method claim 1, wherein the slider layer is formed of woven material.

12. The method of claim 11 wherein the woven material is polyester fabric or cotton fabric.

13. The method of claim 1, wherein the elevated temperature and the residence time are sufficient to cause shrinkage of the slider layer.

14. The method of claim 1, wherein the elevated temperature is 150 to 250° C.

15. A method for dry pretreatment of a slider layer for handrail, the method comprising:
(a) subjecting the slider layer to an elevated temperature for a residence time to cause the slider layer to shrink;
(b) supplying the slider layer to a die head for extrusion in a handrail
(c) while subjecting the slider layer to the elevated temperature and supplying the slider layer to the die head, maintaining the slider layer substantially tension free.

16. The method as claimed in claim 15, including providing at least one tension free loop in the slider layer upstream of the elevated temperature step, and providing at least one tension fee loop in the slider layer after the elevated temperature step and before the die head.

17. The method as claimed in claim 16, wherein the elevated temperature step comprises passing the slider layer between a plurality of heating plates spaced apart and facing one another.

18. A method for dry pretreatment of a slider layer for handrail, the method comprising,
(a) subjecting the slider layer to an elevated temperature for a residence time to pretreat the slider layer;
(b) permitting the slider layer to cool; and
(c) after cooling of the slider layer, supplying the slider layer to the die head of an extruder for a handrail.

19. A method as claimed in claim 18, wherein step (a) comprises passing the slider layer through a heating module.

20. A method as claimed in claim 19, including providing a cooling insert in the die head for cooling the slider layer.

21. A method as claimed in claim 20 wherein the cooling insert is water cooled.

* * * * *